3,153,028
PREPARATION OF XYLENE MODIFIED POLYETHYLENE

William J. Tabar, South Charleston, W. Va., assignor to Union Carbide Corporation, a corporation of New York
No Drawing. Filed Apr. 12, 1961, Ser. No. 102,402
4 Claims. (Cl. 260—94.9)

This invention relates to the production of modified polymers having improved physical properties. More particularly, this invention relates to the reaction of a high molecular weight solid polymer at an elevated temperature in the presence of a chain transfer agent to produce modified polymers having improved physical properties.

The modified polymeric materials of the instant invention are characterized by improved physical properties when compared with the unmodified polymers from which they are obtained. Thus, for example, when the modified polymers of the instant invention are fabricated, for example by extrusion or blow molding or other techniques, into shaped articles, the environmental crack resistance and environmental stress rupture properties of such articles are far superior to the same properties of articles fabricated from unmodified polymeric materials. This is indeed surprising because the thermally degraded polymers of the instant invention have lower molecular weights, as indicated by higher melt indexes, than those of the unmodified materials from which they are obtained, a factor which heretofore had been believed to be detrimental to the crack resistance of an article.

Furthermore, films blown from the modified polymers and copolymers of the instant invention have a lower haze, better gloss, and contain fewer "fisheyes," than films cast from unmodified polymers and copolymers. In addition to having a better appearance, films produced from the modified polymers and copolymers are characterized by improved impact strength, puncture resistance, and tear strength, compared with films produced from unmodified polymers and copolymers. The improved appearance and properties of films formed from the modified polymers and copolymers of the instant invention make them eminently suitable for use as packaging materials.

It has been discovered, in accordance with the instant invention, the homopolymers of ethylene and copolymers thereof with at least one other polymerizable monomer containing the $CH_2=C<$ radical, for example, the copolymers of an alpha olefin with vinyl acetate, divinyl ether, acrylic acid, ethyl acrylate, bicyclo[2.2.1]-2-heptene, etc.; or with carbon monoxide can be modified to produce polymers having the improved physical properties enumerated by heating such polymers or copolymers under autogenous pressure in the presence of a chain transfer agent. The copolymers mainly of interest are those containing a polymerized vinyl ester, vinyl alkyl ethers, divinyl ether, acrylic acid or ester derivative thereof. However, other copolymers as defined above are also suitable. By a "chain transfer agent" is meant a chemical capable of inactivating the free radicals formed by chain scission during the reaction, so as to prevent free radical propagation and stabilize the system against recombination of polymer free radicals. Such chain transfer agents are preferably non-polymerizable organic compounds which are capable of inactivating the polymer radicals produced by the chain scission of the polymers and copolymers employed in the process of the instant invention, but are themselves incapable of undergoing further reaction. In this manner molecules of lower molecular weight are produced. This has been confirmed by melt index analysis.

For the sake of convenience, the invention will be discussed mainly in terms of the modification of polyethylene in the presence of xylene; however, it should be understood that the invention is equally applicable to the modification of all the polymers herein described and all the chain transfer agents herein described.

Illustrative of the chain transfer agents one can mention, for example, hydrogen; the aliphatic hydrocarbons such as heptane, decane, cyclohexane, etc.; the aromatic hydrocarbons such as xylene, etc.; the alcohols such as secondary butanol, isopropanol, etc.; the ketones such as acetone, methyl isobutyl ketone, etc.; and the aldehydes such as acetaldehyde, paraldehyde, etc.

In accordance with one aspect of the instant invention, solid polyethylene is heated at an elevated autogenous pressure with xylene at a temperature of from about 250° C. to about 400° C., preferably from about 300° C. to about 375° C.; for a period of from about 0.25 minute to about 10 minutes, preferably not more than 5 minutes.

The polyethylene employed in the process of the instant invention can be produced by any of the known processes and can be either of the linear or branched-chain variety having a molecular weight of at least 10,000 up to about 3,000,000 or more, and a density of from about 0.910 g./cc. to about 0.960 g./cc. While the density of the base material will vary depending upon the particular polymer or copolymer employed, polymers having a molecular weight of at least 10,000 are employed if polymers having the improved properties set forth above are to be obtained.

While, theoretically, any amount of xylene can be employed, as a practical matter, the amount should seldom exceed 10 percent by weight of the initial charge. In general, an amount of xylene ranging from about 0.25 percent by weight to about 20 percent by weight, preferably from about 1 percent by weight to about 5 percent by weight, based on the weight of the initial charge, is suitable.

The temperature employed in the reaction can vary widely; however, the temperature should not be permitted to rise to a point where excessive degradation of the polymer occurs, i.e., the temperature at which degradation to the extent that carbonization results, or at which the product will be rendered too brittle for conventional applications. A sufficiently elevated temperature should be employed to maintain the base polymer in the molten state and to generate free radicals therefrom. At this temperature chain scission can occur, but not degradation.

When temperatures of from about 250° C. to about 300° C. are employed in the process of the instant invention, the overall melt index of the polymer employed is generally unaltered as a sufficient number of free radicals recombine to maintain the molecular weight constant. When temperatures of from about 300° C. to about 375° C. are employed, however, the melt index of the polymer increases due to a greater amount of chain scission. Generally, polymers having a melt index of from about 0.5 to about 1.0 dg./min. are increased in melt index to from about 3.5 to about 6.5 dg./min. when processed at temperatures of about 355° C.±10° C.

Reaction between the molten polyethylene and xylene should obviously be allowed to continue for the period of time sufficient to produce the modified polymer, as set forth above. Prolonged reaction periods are not recommended since this may result in degradation of the polymer. In general, the reaction time will depend upon the temperature and autogenous pressure employed, with shorter reaction periods being required when higher temperatures and pressures are employed than are required at less elevated temperatures and pressures.

Illustrative of the suitable polymers which can be used as starting materials, or base materials, in this invention, one can mention polyethylene, polypropylene, poly(butene-1), poly(3-methylpentene-1), poly(decene-1), ethylene/butene-1 copolymers, ethylene/propylene copolymers, ethylene/ethyl acrylate copolymers, ethylene/vinyl acetate copolymers, ethylene/methyl methacrylate copolymers, ethylene/carbon monoxide copolymers, ethylene/divinyl ether copolymers, and the like.

A conventional extruder has been found to be a suitable means for effecting a satisfactory blend of the polymer and the chain transfer agent prior to introducing the mixture into the reaction zone. Thus, for example, a mixture of polyethylene pellets and xylene is first fluxed in an extruder to form a homogeneous mass, and then pumped into the reaction zone. Reaction, of course, will commence before the molten blend reaches the reaction zone if the temperature and pressure conditions in the extruder are sufficiently elevated. In fact, the reaction may be conducted entirely in the extruder if this be desirable.

Alternatively, xylene, either alone or in solution in a small amount of an inert liquid solvent, can be added to the molten polyethylene as it emerges from the extruder but before it reaches the reaction zone.

Preferably, the reactor is tubular in shape and contains a "torpedo" which provides for an annular flow path between the tube and torpedo, permitting a more accurate temperature control of the molten mixture.

The unreacted xylene is generally stripped from the molten modified polymer which emerges from the reactor. This may be conveniently accomplished, for example, by heating, or by means of a continuous, twin screw mill operated under vacuum, with the heat from the polymer stream providing the latent heat of vaporization of the xylene.

Unless otherwise specified, all parts and percentages, as used throughout this specification, are by weight; and all p.s.i. measurements are expressed in absolute values.

The data obtained showed that high density resins suitable for the production of film having improved clarity and gloss are produced by this invention. Whereas, a resin having the same melt index and high density as obtained by a direct polymerization is not satisfactory and a resin having the same melt index and high density as obtained by cracking a higher molecular weight polymer is not as satisfactory for the production of film.

The following examples are set forth for purposes of illustration so that those skilled in the art may better understand this invention, and it should be understood that they are not to be construed as limiting this invention in any manner.

EXAMPLE I

A polyethylene resin having a density of about 0.920 which had been produced by polymerizing ethylene at a pressure of about 30,000 p.s.i. and a temperature of about 195° C. in the presence of air as an initiator was fed at the rate of 15 pounds per hour to a 2-inch Hartig extruder which was heated with steam maintained at a temperature of 180° C. The resin was thoroughly fluxed in the extruder and passed into a short steam-jacketed transfer line where xylene (commercial xylol) was pumped through a multihole nozzle into the molten polyethylene at a rate of 150 cc./hr. The molten blend was then pumped into a stainless steel reactor consisting of a tube having a 2-inch inside diameter and 30 inches long, which contained a stainless steel "torpedo" of 1⅞-inches outside diameter. The temperature of the reaction mixture was maintained at 360° C. The rate of flow of the molten reaction mixture was such that the average contact time within the reactor was approximately one to two minutes. The molten blend which emerged from the tube was passed through a short steam-jacketed transfer line and fed into a twin screw mill operating under a pressure of less than about 0.5 inch Hg absolute within a jacket maintained at a temperature of 250° C. The modified polyethylene recovered by the above procedure was evaluated in accordance with conventional testing techniques, and the results obtained were compared with the results obtained for the same resin heated to the same temperature but in the absence of xylene. The data are summarized in Table A below.

*Table A*

| Property | Control | Modified Polyethylene Prepared at 360° C. |
|---|---|---|
| Melt Index,[1] dg./min | 2.8 | 3.3 |
| Density,[2] g./cc | 0.9198 | 0.9192 |
| Film Clarity: | | |
| Haze,[3] percent | 8.6 | 7.2 |
| Gloss,[4] percent | 96 | 112 |
| See-through,[5] ft | 18 | 28 |

[1] ASTM method D 1238-52T.
[2] ASTM method D 1505-57T.
[3] ASTM method D 1003-52. A decrease in haze moduli indicates an improvement.
[4] ASTM method D 523-53T.
[5] ASTM method 1003-59T except that the percent transmission is measured at a deviation of ±0.07 degrees rather than ±1.3 degrees. See-through defines how clearly the detail of an object not in contact with the film can be observed through the film.

EXAMPLE II

A polyethylene resin produced by polymerizing ethylene with a catalyst consisting of an aluminum alkyl and titanium tetrachloride in heptane at a temperature of about 70° C. was passed through the system described in Example I at a rate of 12 to 14 pounds per hour. Xylene (commercial xylol) was pumped through a multihole nozzle into the molten polyethylene at a rate of 100 to 150 cc./hr. just before the polyethylene was fed into the reactor which was maintained at 365°C. The modified polyethylene recovered by the above procedure was evaluated in accordance with conventional testing techniques, and the results obtained were compared with the results obtained for the same resin heated to the same temperatures in the absence of xylene. The data are summarized in Table B below.

*Table B*

| Property | Control | Modified Polyethylene Prepared at 365° C. |
|---|---|---|
| Melt Index, dg./min | 1.4 | 1.5 |
| Flow Ratio (440 p.s.i./44 p.s.i.) | 95 | 57 |
| Density, g./cc | 0.952 | 0.952 |
| Film Clarity: | | |
| Haze, percent | 13.1 | 9.1 |
| Gloss, percent | 102 | 117 |
| See-through, ft | 38 | 56 |
| Impact Strength of Film,[1] ft.-lbs./in.³ | 32 | 58 |

[1] Similar to ASTM method D 256-47T except that the test specimen is a "dogbone" comprised of several thicknesses of film which have a minimum dimension of ⅛ inch.

EXAMPLE III

A polyethylene resin produced by polymerizing ethylene with a catalyst consisting of an aluminum alkyl and titanium tetrachloride in heptane at a temperature of about 70° C. was fed at the rate of 750 pounds per hour to a 10-inch extruder while xylene was metered into the hopper of the extruder at a rate equivalent to 1.8 percent by weight of the total feed. The extruder was heated with steam under a pressure of 400 p.s.i.g. The polyethylene-xylene mixture was thoroughly fluxed in the extruder before being pumped into a twin-screw mill operating under equilibrium pressure (about 3 p.s.i.g.) within a jacket maintained at a temperature of 370° C. The average contact time in the mill was approximately one-half to one minute. The modified polyethylene which emerged from the mill was stripped of xylene by vacuum drying at a temperature of 60° C. The modified polyethylene recovered by the above procedure was evaluated in accordance with conventional testing techniques, and the results obtained were compared with the results obtained from the same resin treated at the same temperature in the absence of xylene. The data are summarized in Table C below.

*Table C*

| Property | Control | Modified Polyethylene Prepared at 370° C. |
|---|---|---|
| Melt Index, dg./min | 6.0 | 4.9 |
| Density, g./cc | 0.95 | |
| Flow Ratio (440 p.s.i./44 p.s.i.) | 69 | 62 |
| Crack Resistance, (30 min. at 100° C.):[1] | Too brittle to measure | |
| $F_0$, hours | | 1.7 |
| $F_{50}$, hours | | 2.6 |

[1] Determined in a manner similar to the well-known test used by the Bell Laboratories.

EXAMPLE IV

Twenty-four and one-half (24.5) pounds of a polyethylene resin produced by polymerizing ethylene with a catalyst consisting of an aluminum alkyl and titanium tetrachloride in heptane at a temperature of about 70° C. was blended with 0.5 pound of isopropanol and passed through the system described in Example I at a rate of about 16 to 18 pounds per hour. The temperature of the reactor was maintained at 370° C. instead of at 360° C. as in Example I. The modified polyethylene recovered by the above procedure was evaluated as in Example I, and the results obtained were compared with the results obtained from the same resin treated at the same temperature in the absence of isopropanol. The data are summarized in Table D below.

*Table D*

| Property | Control | Modified Polyethylene Prepared at 370° C. |
|---|---|---|
| Melt Index, dg./min | 5.5 | 5.4 |
| Density, g./cc | 0.95 | 0.95 |
| Crack Resistance: | | |
| $F_0$, hours | 0.6 | 2.7 |
| $F_{50}$, hours | 1.2 | 4.1 |

What is claimed is:

1. A continuous process for producing xylene modified polyethylene which comprises heating polyethylene having a molecular weight of at least 10,000, and a density of from about 0.910 to about 0.960, in the presence of xylene at a temperature of from about 250° C. to about 400° C. under autogenous pressure for a period of from about 0.25 minute to about 10 minutes.

2. A continuous process for producing xylene modified polyethylene which comprises heating polyethylene having a molecular weight of at least 10,000, and a density of from about 0.910 to about 0.960, in the presence of xylene at a temperature of from about 300° C. to about 375° C., under autogenous pressure for a period of from about 0.25 minute to about 5 minutes.

3. A continuous process for producing xylene modified polyethylene which comprises heating polyethylene having a molecular weight of at least 10,000, and a density of from about 0.910 to about 0.960, in the presence of from about 0.25 percent by weight to about 20 percent by weight of xylene, based on the combined weight of the xylene and polyethylene, at a temperature of from about 300° C. to about 375° C., under autogenous pressure for a period of from about 0.25 minute to about 5 minutes.

4. A xylene modified polyethylene produced by heating polyethylene having a molecular weight of at least 10,000, and a density of from about 0.910 to about 0.960, in a continuous process in the presence of xylene at a temperature of from about 250° C. to about 400° C. under autogenous pressure for a period of from about 0.25 minute to about 10 minutes.

References Cited in the file of this patent
UNITED STATES PATENTS

| | | |
|---|---|---|
| 2,976,272 | Coover et al. | Mar. 21, 1961 |
| 2,981,726 | Gordon | Apr. 25, 1961 |
| 2,996,494 | Cash | Aug. 15, 1961 |